United States Patent

Spivack et al.

[15] 3,676,531
[45] July 11, 1972

[54] BIS-(HINDERED PHENOL)-ALKANE PHOSPHONATES

[72] Inventors: John D. Spivack, Spring Valley; Martin Dexter, Briarcliff Manor, both of N.Y.

[73] Assignee: Ciba-Geigy Corporation, Ardsley, N.Y.

[22] Filed: May 19, 1969

[21] Appl. No.: 825,918

[52] U.S. Cl..........................260/953, 260/45.95, 252/49.9, 208/20, 44/76
[51] Int. Cl. ..........................................C07f 9/40
[58] Field of Search..................................260/953

[56] References Cited

UNITED STATES PATENTS 3,534,127 10/1970 Spivack..............................260/953 X
3,281,505 10/1966 Spivack ..................................260/953

OTHER PUBLICATIONS

Iliopulos et al., Chemical Abstracts, Vol. 63 (1965) page 9,979 and 9,980

Primary Examiner—Joseph Rebold
Assistant Examiner—Richard L. Raymond
Attorney—Karl F. Jorda, Bruce M. Collins, Martin J. Spellman, Jr. and Nestor W. Shust

[57] ABSTRACT

Bis-(hindered phenol)-alkane phosphonates having the formula

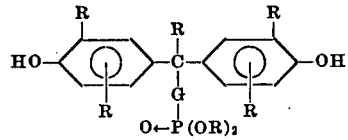

wherein R is alkyl or other groups can be prepared by condensation reactions. These compounds are useful as stabilizers of organic materials subject to oxidative deterioration.

7 Claims, No Drawings

BIS-(HINDERED PHENOL)-ALKANE PHOSPHONATES

DETAILED DESCRIPTION

This invention relates to bis-(hindered phenol)-alkane phosphonate compounds and compositions otherwise subject to oxidative deterioration stabilized by the incorporation therein of said compounds.

In particular the present invention pertains to bis-(hindered phenol)-alkane phosphonates having the formula:

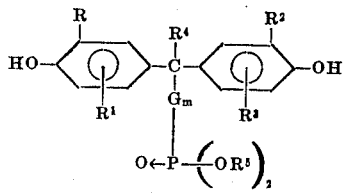

wherein $R$, $R^1$, $R^2$ and $R^3$ are hydrogen alkyl groups having one to 18 carbon atoms or cycloalkyl having five to 12 carbon atoms, $R^4$ is hydrogen or alkyl having up to 18 carbon atoms, $R^5$ is alkyl, alkaryl or aralkyl having up to 30 carbon atoms or alkylthio (lower alkyl where the alkyl has up to 30 and (lower) alkyl up to six carbon atoms, G is alkylene group having from one to six carbon atoms, $m$ is 0 or 1.

By the term "alkyl" and "alkylene", is intended groups containing branched or straight chains. Representative alkyl groups are methyl, ethyl, propyl, isopropyl, butyl, t-butyl, octyl, t-octyl, decyl, dodecyl, octadecyl, tetracosyl, triacontyl and the like. Representative alkylene groups are methylene, ethylene, propylene, isopropylene, butylene, t-butylene, hexylene and the like. Cycloalkyl groups are illustrated by cyclopentyl, cyclohexyl, cyclooctyl, cyclodecyl, cyclododecyl and the like. Illustrative examples of alkyl thio (lower) alkyl group are methylthioethyl, hexylthiomethyl, decylthioethyl, dodecylthiobutyl, hexadecylthiohexyl, tetradecylthioethyl, triacontylthioethyl and the like. Aralkyl are illustrated by benzyl, phenylethyl, 6-phenylhexyl, 12-phenyldodecyl, 12-α-napthyldodecyl, 24-phenyltetracosyl, 30-phenyltriacontyl and the like.

In the above formula the phenolic group has two alkyl substitutents. One alkyl substituent is in a position ortho to the hydroxy group and a second alkyl group is either (a) in the other position ortho to the hydroxy group or (b) in the position meta to the hydroxy group and para to the first alkyl group. Preferred are the dialkyl-4-hydroxyphenyl groups wherein the alkyl groups are branched groups such as t-butyl or t-octyl. However, other arrangements are also contemplated, such as 3-t-butyl-6-methyl-4-hydroxyphenyl group, 3,5-di-isopropyl-4-hydroxyphenyl group, 3,5-di-t-octyl-4-hydroxyphenyl group, 3,5-dimethyl-4-hydroxyphenyl group or 3,5-di-n-octadecyl-4-hydroxyphenyl group.

In a preferred embodiment, $R$, $R^1$, $R^2$ and $R^3$ are lower alkyl groups having up to eight carbon atoms, especially tertiary alkyl groups such as tert-butyl, tert-amyl, tert-octyl and the like. Group G is preferably methylene and $m$ can be zero or one. $R^4$ is preferably an alkyl group having four to 24 carbon atoms and most preferably eight to 24 carbon atoms when the integer $m$ is zero. However, when the integer $m$ is one, $R^4$ is an alkyl group having from one to 24 carbon atoms. $R^5$ groups are alkyl or alkaryl groups having up to 30 carbon atoms.

The bis-(hindered phenol)-alkane phosphonates of this invention can be prepared by a variety of condensation procedures. One method is to condense a haloalkyl ketone with a phenol or a hindered phenol in the presence of a Lewis acid. The resulting 2,2-bis(hindered phenol)-alkyl halide is reacted with trialkyl phosphite or sodium dialkyl phosphonate to yield the corresponding bis-(hindered phenol)-alkane phosphonate. Another method is to condense directly a ketophosphonate with a hindered phenol in the presence of a Lewis acid. The preparations of the compounds of this invention are described in greater detail, for illustrative purposes only, in Examples 1 to 10 below.

EXAMPLE 1

Preparation of diethyl 2,2-bis-(3',5'-di-t-butyl-4'-hydroxyphenyl)-1-propane phosphonate A. 2,2-Bis-(3',5'-di-t-butyl-4'-hydroxyphenyl)-1-chloropropane To a solution containing 46.1 parts of chloroacetone, 206 parts of 2,6 di-t-butylphenol and 200 parts by volume of ethylene chloride, was added 98 parts of sulfuric acid. The reaction mixture was stirred for 2 hours at −15° to −10° C. and poured into a cooling mixture of 300 parts of ice and 300 parts of water. The resulting dispersion was diluted with 3 liters of ethanol and allowed to stand overnight. The precipitate was filtered, dried, triturated in hexane and the resulting solid recrystallized from n-hexane yielding the product melting at 151° to 153°C.

Elemental Analysis:

| | | |
|---|---|---|
| Calculated: C–76.41; | H–9.72, | Cl–7.28 |
| Found: C–76.15; | H–9.16; | Cl–7.20 |

B. Diethyl 2,2-Bis-(3',5'-di-t-butyl-4'-hydroxyphenyl)-1-propanephosphonate

To 2.76 parts of diethyl phosphite dissolved in 100 parts by volume of xylene was added 0.46 parts sodium. The reaction mixture was heated at 110° C. until all of sodium was reacted. The product of part (A) above was then dissolved in 25 parts by volume of xylene and added slowly at 45° to 50° C. to the reaction mixture. The resulting reaction mixture was heated at 50° C. for 3 hours and then evaporated to dryness under a reduced pressure. The residue was dissolved in 50 parts by volume of methanol, water was added to the methanol solution to the point of turbidity and the solution was then filtered. The filtrate was concentrated to dryness and the residue was recrystallized from heptane yielding the product melting at 156° to 158°C.

Elemental Analysis:

| | | |
|---|---|---|
| Calculated: C–71.36; | H–9.76; | P–5.26 |
| Found: C–70.83; | H–9.60; | P–5.24 |

EXAMPLE 2

Dimethyl 2,2-bis(3',5'-di-tert-butyl-4'-hydroxyphenyl)-1-nonadecanephosphonate

If 159 parts of 1-chlorononadecanone-2 is reacted according to step (A) of Example 1 to yield 2,2-bis(3',5'-di-tert-butyl-4-hydroxyphenyl)-1-chlorononadecane which in turn is reacted with 2.2 parts of dimethyl phosphite is reacted substantially as in step (B), the resulting product will be dimethyl 2,2-bis(3',5'-di-tert-butyl-4'-hydroxyphenyl)-1-nonadecanephosphonate.

EXAMPLE 3

Preparation of dimethyl α,α -bis-(3,5-di-isopropyl-4-hydroxyphenyl)-n-octadecylphosphonate To the reaction vessel flushed with nitrogen were added 15 g of dimethyl octadecanoylphosphonate and 28.4 g of 2,6-diisopropylphenol. The ingredients were melted and then cooled to 35°–40° C. and saturated with boron trifluoride. Cooling was required to maintain the temperature below 40° C. The reaction mixture was stirred for 40 min. at 50°–55° C., and then dissolved in 40 ml. of acetic acid and the solution poured on crushed ice. The resulting mixture was extracted with benzene and the extract washed successively with 6 N hydrochloric acid and water and then dried over anhydrous sodium sulfate. The solvent was distilled off at 130° C. and 0.4 mim of pressure, yielding 29 g of a residue. The residue was dissolved in 150 ml. of boiling acetonitrile and on cooling the solution a solid was obtained which was ground and triturated with acetonitrile. The resulting slurry was cooled, filtered and washed with acetonitrile yielding 24.5 g. of the product. Upon recrystallization of the product from hot petroleum ether an analytical sample was obtained which had the melting point of 70°–72 C. and analyzed as follows:

| %C | %H | %P |
|---|---|---|
| Calculated: 73.90 | 10.58 | 4.33 |
| Found: 74.24 | 10.10 | 4.33 |
| 74.16 | 10.25 | 4.29 |

EXAMPLE 4

Preparation of dimethyl-α,α-bis-(3-methyl-4-hydroxyphenyl)-n-octadecylphosphonate Following the procedure described in Example 3, 22.5 g of dimethyl octadecanoylphosphonate was reacted with 25.9 g. of o-cresol to yield dimethyl-α,α -bis-(3-methyl-4-hydroxyphenyl)octadecylphosphonate. The product was a white crystalline solid melting at 159°–161° C. after recrystallization from ethyl acetate.

EXAMPLE 5

Preparation of dimethyl-α,α -bis-(4-hydroxyphenyl)-n-octadecyl-phosphonate

Following the procedure described in Example 3, 26.3 g. of dimethyl octadecanoylphosphonate was reacted with 26.4 g. of phenol yielding dimethyl-α,α -bis-(4-hydroxy-phenyl)-n-octadecylphosphonate in the form of white crystals having a melting point of 169°–172° C. after successive recrystallization from isopropanol and ethyl acetate.

Elemental Analysis:

| Calculated: C–70.29; | H–9.42; | P–5.66 |
|---|---|---|
| Found: C–70.58; | H–9.21; | P–5.71 |

EXAMPLE 6

Preparation of dimethyl-α,α-bis-[3,5-di-(1'-methylheptadecyl)-4-hydroxyphenyl]-n-octadecylphosphonate The product of Example 5, dimethyl-α,α -bis-(4-hydroxyphenyl)octadecylphosphonate, is dispersed in 1-octadecene and boron trifluoride gas passed through the dispersion. The resulting reaction mixture is dissolved in benzene, washed with water and sodium bicarbonate and the product recovered by conventional means.

EXAMPLE 7

Preparation of diphenyl-α,α -bis-(3,5-diisopropyl-4-hydroxyphenyl)nonanephosphonate Following the procedure of Example 3, 2,6-diisopropylphenol is reacted with diphenyl-n-nonanoyl phosphonate to yield the product.

EXAMPLE 8

Preparation of di-p-t-octylphenyl-2,2-bis-(3',5'-di-t-butyl-4'-hydroxyphenyl)-1-hexanephosphonate Following the procedure of Example 1, in step (A) 2,6-di-t-butyl-4-hydroxyphenol is reacted with 1-chlorohexanone-2 to yield the intermediate 2,2-bis-(3',5'-di-t-butyl-4'-hydroxyphenyl)-1-chlorohexane. In step (B) said intermediate is reacted with di-p-t-octylphenylphosphite to yield the product.

EXAMPLE 9

Preparation of ditriacontyl-5,5-bis-(3',5'-di-t-butyl-4'-hydroxyphenyl)-n-hexanephosphonate.

Using the procedure of Example 1, in step (A) 6-bromo-n-hexanone-2 is reacted with 2,6-di-t-butylphenol to yield 2,2-bis-(3',5'-di-t-butyl-4'-hydroxyphenyl)-6-bromohexane as the intermediate. Said intermediate is reacted in step (B) with bis-(triacontyl)phosphite to yield ditriacontyl-5,5-bis-(3',5'-di-t-butyl-4'-hydroxyphenyl)-n-hexanephosphonate.

EXAMPLE 10

Preparation of didodecylbenzyl-α,α-bis-(3,5-di-isopropyl-4-hydroxyphenyl)-n-octadecylphosphonate.

Following the procedure described in Example 3, didodecylbenzyl octadecanoylphosphonate is reacted with 2,6-diisopropylphenol to yield the product.

The bis-(hindered phenol)-alkylene phosphonates of the present invention are stabilizers of organic materials normally subject to oxidative deterioration. Materials which are thus stabilized according to the present invention include synthetic organic polymeric substances such as vinyl resins formed from the polymerization of vinyl halides or from the copolymerization of vinyl halides with unsaturated polymerizable compounds, e.g., vinyl esters, α,β-unsaturated aldehydes and unsaturated hydrocarbons such as butadienes and styrene; poly-α-olefins such as polyethylene, polypropylene, polybutylene, polyisoprene and the like, including copolymers of poly-α-olefins; polyurethanes such as are prepared from polyols and organic polyisocyanates; polyamides such as polyhexamethylene adipamide and polycaprolactam; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., di-(2-ethylhexyl)-azelate, pentaerylthritol tetraceproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic diesel oil, mineral oil, fuel oil, drying oil, cutting fluids, waxes, resins and the like, fatty acids such as soaps and the like.

In general the stabilizers of this invention are employed from about 0.005 percent to about 10 percent by weight of the stabilized composition. A particularly advantageous range for polyolefins such as polypropylene is from about 0.01 percent to about 5 percent.

The stabilizers employed in this invention may be used alone or in combination with other stabilizers or additive materials. Especially useful in certain cases is a composition containing an active compound of the present invention with the stabilizer dilauryl β-thiodipropionate or distearyl β-thiodipropionate.

Furthermore, compounds of the formula:

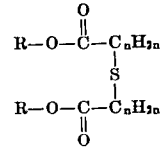

wherein
R is an alkyl group having from six to 24 carbon atoms; and
n is an integer from 1 to 6,
are useful stabilizers in combination with the novel antioxidant compounds of the present invention.

Other antioxidants, antiozonants, thermal stabilizers, ultraviolet light absorbers, coloring materials, dyes, pigments, metal chelating agents, etc., and light stabilizers may also be used, in combination, with the active compounds of the present invention.

OVEN AGING TEST

Unstabilized polypropylene powder (Hercules Profax 6501) is thoroughly blended with an antioxidant. The blended material is then milled on a two roller mill at 182° C. for 10 minutes after which time the stabilized polypropylene is sheeted from the mill and allowed to cool.

The milled polypropylene sheet is then cut into small pieces and pressed for 7 minutes on a hydraulic press at 218° C. and 2,000 pounds per square inch pressure. The resultant sheet of 25 mil thickness is cut into small plaques and tested for resistance to accelerated aging in a forced draft oven at 150° C.

When unstabilized polypropylene is tested as described above, its oven life is about 3 hours.

FADEOMETER TEST

The 25 mil plaques prepared as described in the Oven Aging Test are placed on a white card stock background and exposed in a Fadeometer. The specimens are tested for embrittlement at 20 hours intervals by bending them 180°. The result of this test is recorded as the number of hours the specimen stayed in the Fadeometer until a clean break is obtained.

Unstabilized polypropylene tested in a Fadeometer as noted above will generally fail after 40 to 60 hours.

The following examples are intended to illustrate further the nature of the present invention without introducing any limitations.

EXAMPLE 10

Using the procedure described above, polypropylene was stabilized with 0.5 percent by weight of diethyl 1,2-bis(3,5-di-t-butyl-4-hydroxyphenyl)-ethanephosphonate. The thus stabilized polypropylene had the oven aging life of 120 hours.

Comparable stabilization is obtained when said stabilizer is employed in the amount of 0.01 percent by weight of polypropylene.

This Example was repeated except that said stabilizer was employed in the amount of 0.1 percent by weight in combination with 0.5 percent by weight of dilaurylthiodipropionate. Upon testing the following results were obtained:

| Oven Aging Test | 275 hrs. |
| Fadeometer Test | 240 hrs. |

EXAMPLE 11

Polypropylene was stabilized with 0.5 percent by weight of diethyl 2,2-bis(3',5'-di-t-butyl-4'-hydroxyphenyl)-1-propanephosphonate and test plaques prepared as described above. The oven aging life of the stabilized polypropylene was 360 hours.

Similar stabilization results are obtained when said compound is added in the amount of 0.1, 0.25 and 1.0 percent by weight to polyethylene, polypropylene, polybutadiene, polystyrene, butadiene-styrene compolymer, polyvinylchloride and a polyamide.

When this Example was repeated employing 0.1 percent by weight of said stabilizer and 0.5 percent by weight of dilaurylthiodipropionate the following results were obtained:

| Oven Aging Test | 537 hrs. |
| Fadeometer Test | 420 hrs. |

EXAMPLE 12

Polypropylene was stabilized as described above with 0.5 percent by weight of diethyl-1,2-bis-(3',5'-di-t-butyl-4'-hydroxyphenyl)ethanephosphonate. This composition was found to be stable in a Fadeometer for 120 hours.

When this Example was repeated using 0.1 percent of said stabilizer in combination of 0.5 percent of dilaurylthiodipropionate, the life of the composition in the Fadeometer was 240 hours.

EXAMPLE 13

Using the procedure described above, polypropylene was stabilized with 0.5 percent by weight of diethyl 2,2-bis-(3',5'-di-t-butyl-4'-hydroxyphenyl)-1-propane phosphonate. The thus stabilized polypropylene was found to be stable in the Fadeometer for 360 hours.

This Example, when repeated using 0.1 percent of said stabilizer and 0.5 percent of dilaurylthiodipropionate gave the following results:

| Oven Aging Test | 537 hrs. |
| Fadeometer Test | 420 hrs. |

Comparable results are obtained when the stabilizers of Examples 12 and 13 are employed in the amount of 0.1 percent, 1.0 percent and 5 percent by weight. Similarly, better results are obtained when said stabilizers are used in combination with a distearylthiodipropionate or dilaurylthiodipropionate synergists.

Additional examples are presented in Table I below. The samples were prepared as described above employing the above mentioned polypropylene substrate. The oven aging and fadeometer tests were also carried out as described above.

TABLE 1

| Example No. | Stabilizer | Wt., percent | Synergist | Wt., percent | Oven aging hours | Fadeometer, hours |
|---|---|---|---|---|---|---|
| 14 | Compound from Example 3. | 0.1 | DSTDP | 0.3 | 880 | 590 |
| 15 | Compound from Example 4. | 0.1 | DSTDP | 0.3 | 670 | 640 |
| 16 | Compound from Example 5. | 0.1 | DSTDP | 0.3 | 550 | 590 |
| 17 | Compound X | 0.1 | DSTDP | 0.3 | 780 | 590 |
| 18 | No stabilizer | | DSTDP | 0.3 | 25 | 320 |

NOTE.—DSTDP = distearylthiodipropionate. Compound X is dimethyl-α,α-bis(4-hydroxy-2-methylphenyl)-n-octadecylphosphonate (M.P., 146°–149° C.).

EXAMPLE 19

Stabilized gasoline is prepared by incorporating into gasoling having no additives and no stabilizers therein 0.05 percent by weight of diphenyl-α,α -bis-(3,5-diisopropyl-4-hydroxyphenyl)nonanephosphonate.

EXAMPLE 20

Paraffin wax (m.p. 125°–128° F.) is stabilized by incorporating therein 0.001 percent by weight of di-p-t-octylphenyl-2,2-bis-(3',5'-di-t-butyl-4'-hydroxyphenyl)-1-hexanephosphonate.

EXAMPLE 21

A stabilized high temperature lubricating oil is prepared by incorporating 2 percent by weight of ditriacontyl-5,5-bis-(3',5'-di-t-butyl-4'-hydroxyphenyl)-n-hexanephosphonate into the lubricant, which comprises diisoamyladipate.

EXAMPLE 22

High impact polystyrene resin containing elastomer (i.e., butadiene-styrene) is stabilized against loss of elongation properties by incorporation of 0.5 percent by weight of dimethyl-α,α -bis-[3,5-di-(1-methylheptadecyl)-n-nonadecane]phosphonate.

EXAMPLE 23

A mixture of 1 kilogram of polyoxymethylene diacetate (molecular weight of about 30,000), 5 g of dimethyl-α,α -bis-(4-hydroxyphenyl)-n-octadecylphosphonate and 2 g of dicyandiamide are extruded at 220° C. to yield a stabilized product.

EXAMPLE 24

A mixture of 1M nylon 6,6 salt (hexamethylene diamine adipate) 0.01 M hexamethylene diamine and 1 percent by weight of dimethyl-α,α'-bis-(3-methyl-4-hydroxyphenyl)-n-octa-decylphosphonate are added to a polymerization tube and heated for one hour at 220° C. and atmospheric pressure. The temperature is then raised to 285° C. and the pressure reduced slowly to 1 mm. The tube is maintained under these conditions for 30 minutes, cooled and flushed with nitrogen.

The thus stabilized polyhexamethylene diamine adipate shows less color development and weight loss than does an unstabilized sample.

What is claimed is:

1. A compound of the formula:

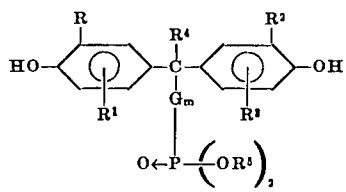

wherein
R, R¹, R² and R³ are alkyl groups having one to 18 carbon atoms or cycloalkyl having five to 12 carbon,
R⁴ is hydrogen or alkyl group having up to 18 carbon atoms,
R⁵ is alkyl, aralkyl or alkaryl having up to 30 carbon atoms,
G is alkylene group having from one to six carbon atoms.

2. A compound of claim 1 wherein R, R¹, R² and R³ are lower alkyl groups ortho to the hydroxy groups.

3. A compound of claim 1 wherein R⁴ and R⁵ are independently lower alkyl groups.

4. A compound according to claim 1, said compound being diethyl-2,2-bis-(3',5'-di-t-butyl-4'-hydroxyphenyl)-1-propane phosphonate.

5. A compound according to claim 1, said compound being dimethyl 2,2-bis(3',5'-di-tert-butyl-4'-hydroxyphenyl)-1-nonadecanephosphonate.

6. A compound according to claim 1, said compound being di-p-t-octylphenyl-2,2-bis-(3',5'-di-t-butyl-4'-hydroxyphenyl)-1-hexanephosphonate.

7. A compound according to claim 1, said compound being ditriacontyl-5,5-bis-(3',5'-di-t-butyl-4'-hydroxyphenyl)-n-hexanephosphonate.

* * * * *